(12) United States Patent
Leonhardt (10) Patent No.: US 7,682,215 B2
(45) Date of Patent: Mar. 23, 2010

(54) NOVELTY CANDY DEVICE (76) Inventor: Paul Leonhardt, 937 Promontory Dr. West, Newport Beach, CA (US) 92660

( * ) Notice: Subject to any disclaimer, the term of this patent is extended or adjusted under 35 U.S.C. 154(b) by 0 days.

(21) Appl. No.: 11/801,368

(22) Filed: May 9, 2007

(65) Prior Publication Data
US 2008/0009217 A1  Jan. 10, 2008

Related U.S. Application Data (60) Provisional application No. 60/800,217, filed on May 11, 2006.

(51) Int. Cl.
A63H 3/00 (2006.01)
A63H 33/00 (2006.01)

(52) U.S. Cl. .................. 446/73; 446/386; 426/104

(58) Field of Classification Search ............... 446/72, 446/73, 386; 426/104, 134
See application file for complete search history.

(56) References Cited

U.S. PATENT DOCUMENTS 1,950,539 A * 3/1934 Brownfield ............... 383/70
4,333,974 A * 6/1982 Davis ....................... 428/16
D359,607 S * 6/1995 Yun ......................... D1/106
5,454,746 A * 10/1995 Guegan et al. ............. 446/72
5,955,099 A * 9/1999 White ...................... 424/440
6,054,158 A * 4/2000 Hart et al. .................. 426/134
6,136,352 A * 10/2000 Silverstein et al. ......... 426/115
6,221,407 B1 * 4/2001 Gallart et al. ............... 426/91
6,375,236 B1 * 4/2002 Ducharme ................ 294/1.1
6,485,348 B2 * 11/2002 Diresta .................... 446/73

* cited by examiner

Primary Examiner—Kien T Nguyen
(74) Attorney, Agent, or Firm—James F McLaughlin (57) ABSTRACT The present invention is a candy lollipop device that can be converted to a humanoid or character figure with a wobbling head after consumption of the candy. The device comprises a lower body have a flat base and an upper body with a wobbly head. The lower body further houses a candy or similar confection. Both the upper and lower body portions are modeled to mimic fanciful or commonly known characters and personalities, and may include information imprinted on the flat base and at other suitable locations on the device.

20 Claims, 8 Drawing Sheets

NOVELTY CANDY DEVICE

CROSS REFERENCES TO RELATED APPLICATIONS

This is a non-provisional patent application claiming benefit of priority of U.S. Provisional Patent Application No. 60/600,217, filed on May 11, 2006 in the name of Paul Leonhardt for "Novelty candy device."

STATEMENT REGARDING FEDERALLY SPONSORED RESEARCH

Not Applicable

STATEMENT REGARDING COPYRIGHTED MATERIAL

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

REFERENCE TO APPENDIX

Not Applicable

BACKGROUND OF THE INVENTION

A. Field of the Invention

The present invention relates to novelty candy devices, and more particularly, to a novelty candy device that is configured to represent a humanoid or character figure and can be converted to a bobble toy after consumption of the candy.

B. Prior Art

Lollipops in their basic form are well known in the public domain. The conventional basic form of a lollipop is a thin usually cylindrical cardboard or plastic stick, which has a piece of hard candy attached to one end. The candy can be molded into any shape and consumed while holding the stick. Many designs of candy holding structures, which replace or are used in conjunction with the stick on which the candy mounts, are possible. These designs aim at providing an entertaining or aesthetic appeal.

Several novelty candy devices with a variety of designs are known in the art. For example, U.S. Pub. No. 20030138527 to Coleman discloses an animated or non-animated body novelty candy device that comprises a main housing or body including a pliable material with a wire or stiffener in the body so that the body can be shaped into different shapes. The housing includes a means to receive and hold a candy stick on which a pop is secured. The pop can be formed directly on one or more appendages of the body instead of using the stick.

In U.S. Pat. No. 6,054,158 to Hart a lollipop that has a stem configured to represent a creature is disclosed. The stem includes a gripping portion between a lower base and an upper head portion. A body of candy surrounds the upper head portion. The candy is translucent such that the head portion of the creature is visible from outside. The lower base preferably has a flat bottom surface to enable the device to stand by itself on a flat support surface.

U.S. Pat. No. 5,919,079 to Coleman discloses a play sword lollipop-holding device for entertaining children, which comprises a plastic handle and a plurality of plastic telescoping sleeves attached to the handle. The plastic handle is the main housing with the plastic telescoping sleeves attached to it. The last sleeve, which is the smallest, has an aperture at the end to hold a lollipop on a stick. A child can enjoy playing and eating his/her play sword lollipop with the flick of their wrist. This action causes the telescoping sleeves and candy to extend outward from the handle making a sword to play with. When not in use, the telescoping sleeves can be collapsed one into the other for easy carrying and storage.

Although the above devices are related to novelty candys, the present invention provides a humanoid or character figure that mimics a famous sportsperson, actor, other well-known people, or animals.

BRIEF SUMMARY OF THE INVENTION

It is an object of the present invention to provide an improved novelty candy device that can be converted to a humanoid or character figure after consumption of the candy.

A further object is to provide an improved novelty candy device that includes a wobbling head.

Finally, it is an object of the present invention to provide an improved novelty candy device that can be used as a collectible or souvenir. These and other objects of the present invention will become better understood with reference to the appended Summary, Description, and Claims.

The present invention, in brief summary, comprises an improved candy device that resembles a humanoid or character figure. The device includes a separate lower body portion and upper body portion. The lower body portion is composed of or surrounded by candy. The upper body portion includes a body that can go over the candy of the lower body portion and a wobbly head.

The head can be designed to mimic a variety of humanoid figures, or characters, including a famous sportsperson, a movie actor, or other characters such as cartoon characters, animals, superheroes, robots, seasonal characters and other personalities well known in different capacities. The body can also be designed to suit or contrast with the head portion of the device.

DETAILED DESCRIPTION OF THE EMBODIMENT

Figure 1:
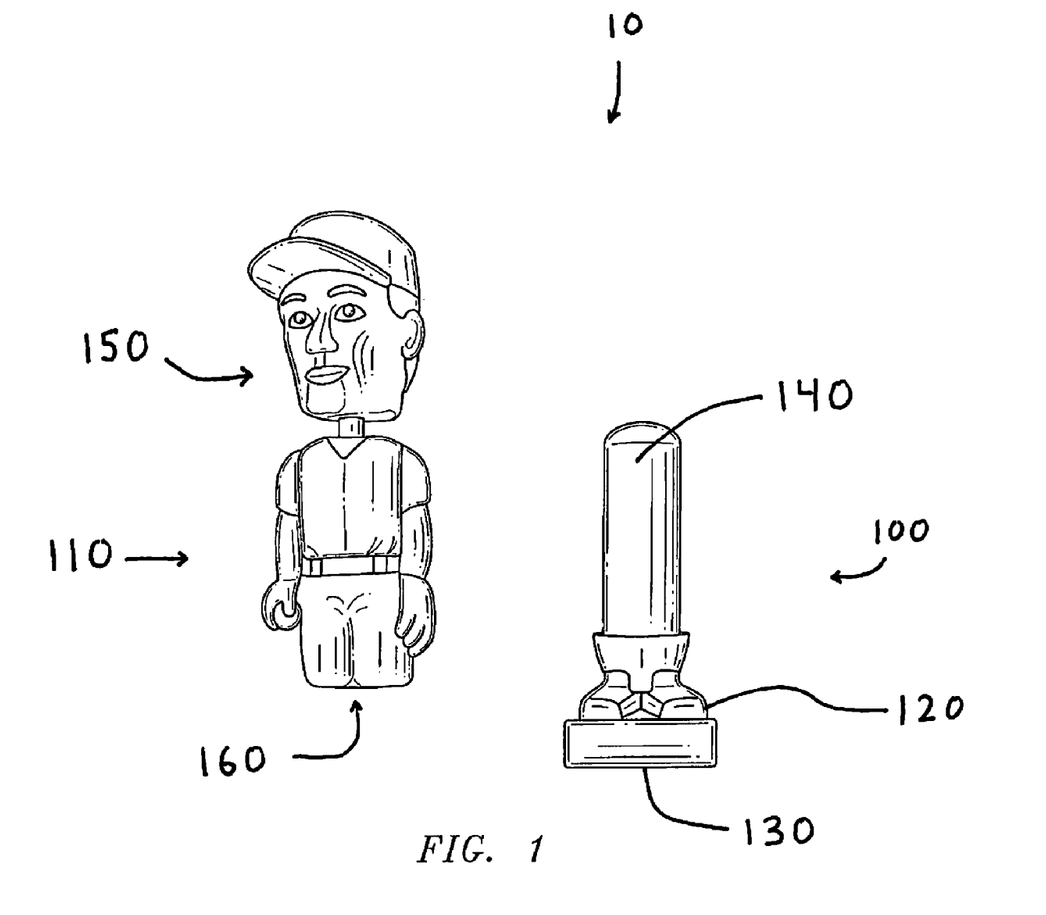
FIG. 1 is a front isometric illustration of the novelty candy device of the present invention showing the upper body portion and the lower body portion.
Figure 2:
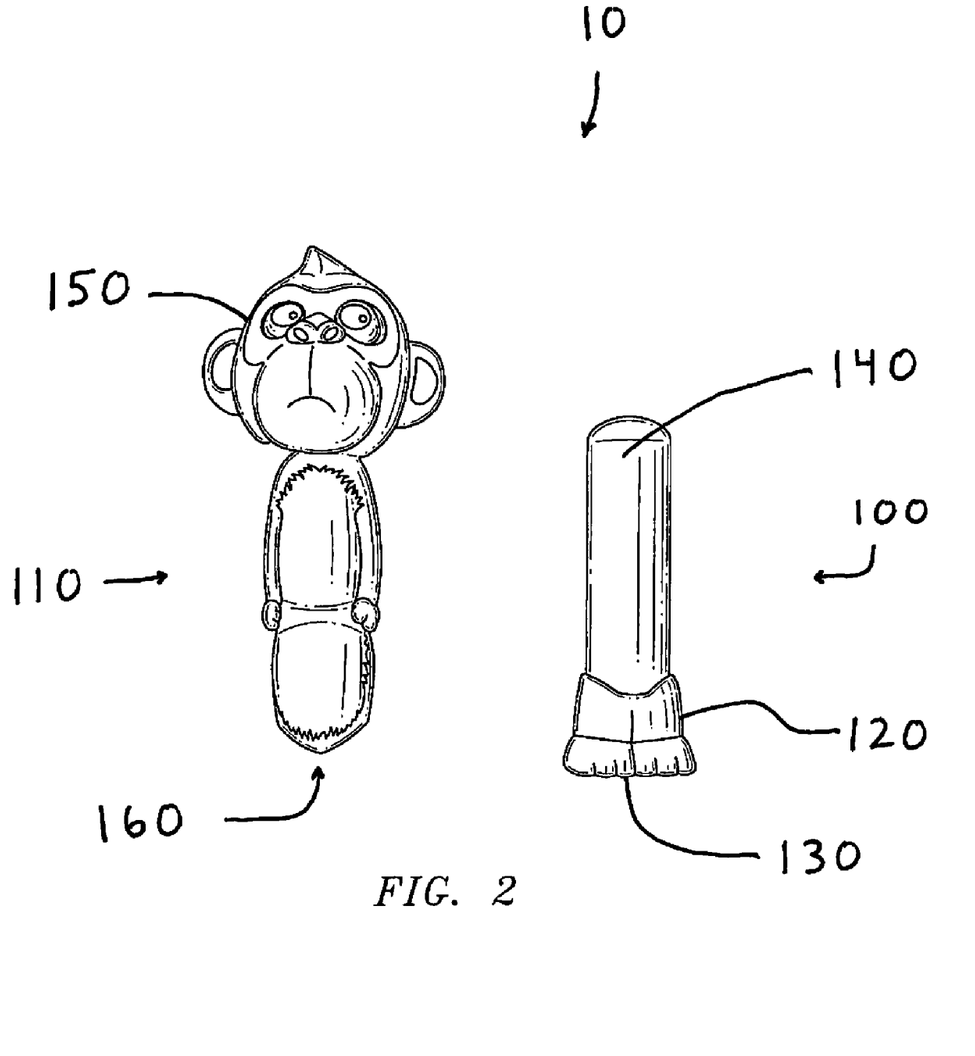
FIG. 2 is a front isometric illustration of an alternative embodiment of the novelty candy device of FIG. 1.
Figure 3:
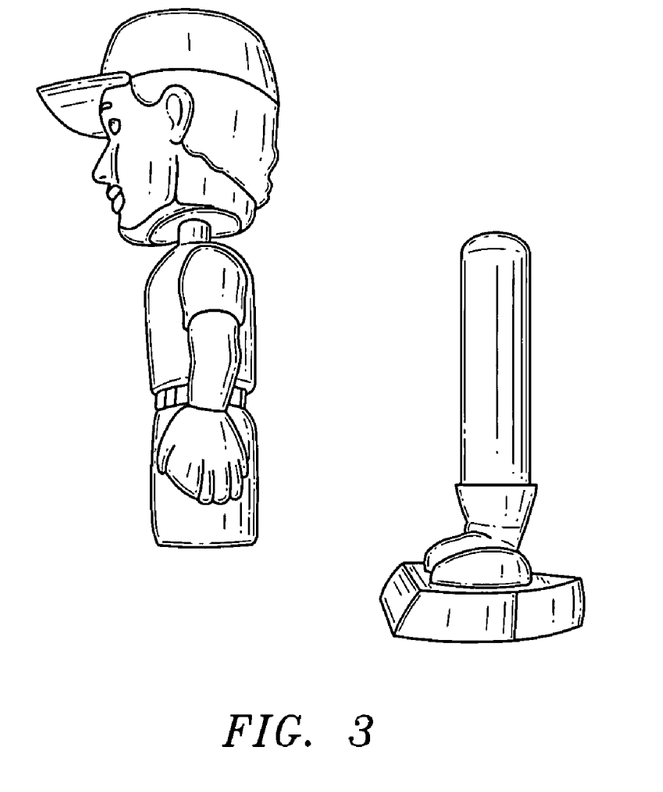
FIG. 3 is a side isometric illustration of the novelty candy device of FIG. 1 showing the upper body portion and the lower body portion.
Figure 4:
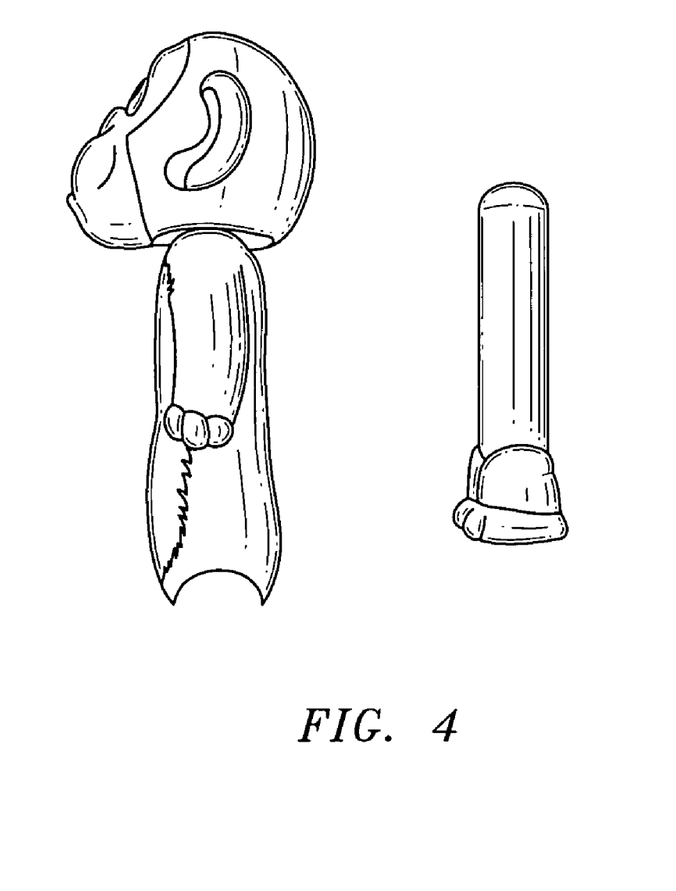
FIG. 4 is a side isometric illustration of the alternative embodiment of FIG. 2 showing the upper body portion and the lower body portion.
Figure 5:
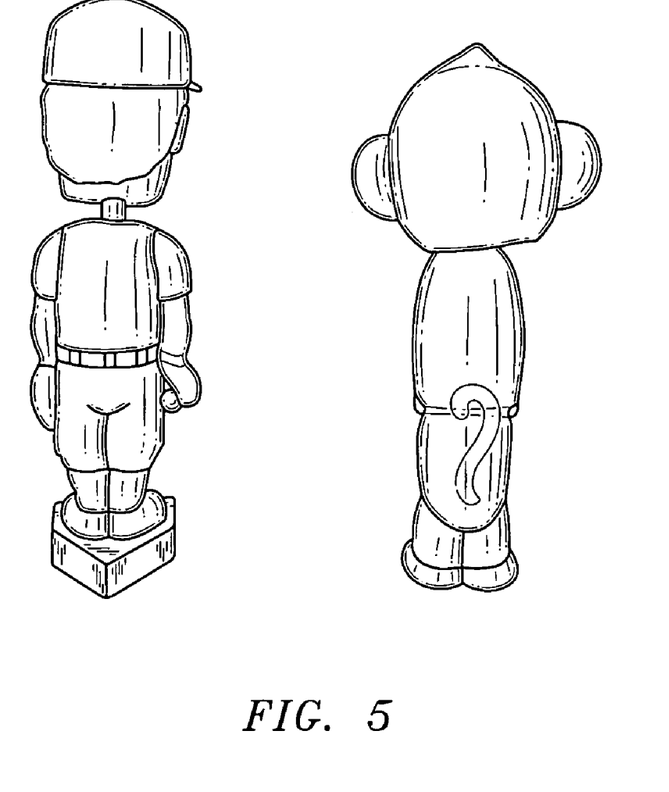
FIG. 5 is a rear isometric view showing the novelty candy devices of FIGS. 1 and 2 with the upper body portion attached to the lower body portion.
Figure 6:
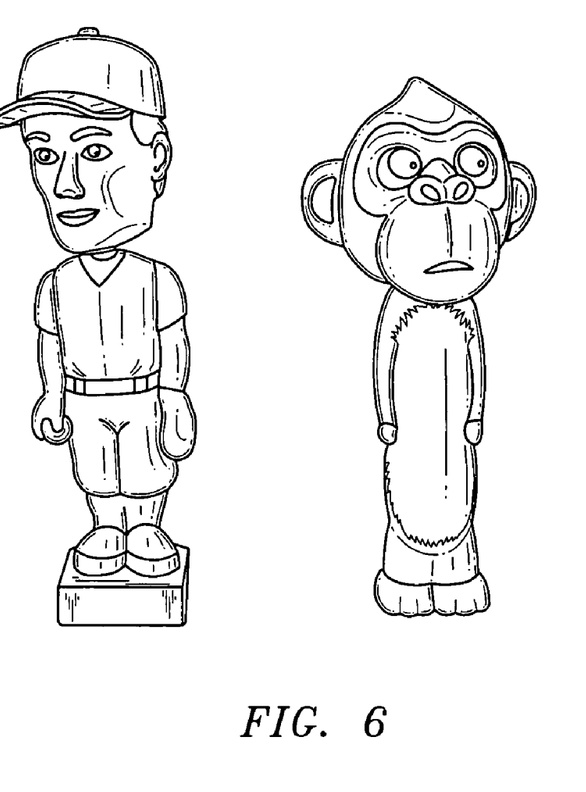
FIG. 6 is a front isometric view showing the novelty candy devices of FIGS. 1 and 2 with the upper body portion attached to the lower body portion.
Figure 7:
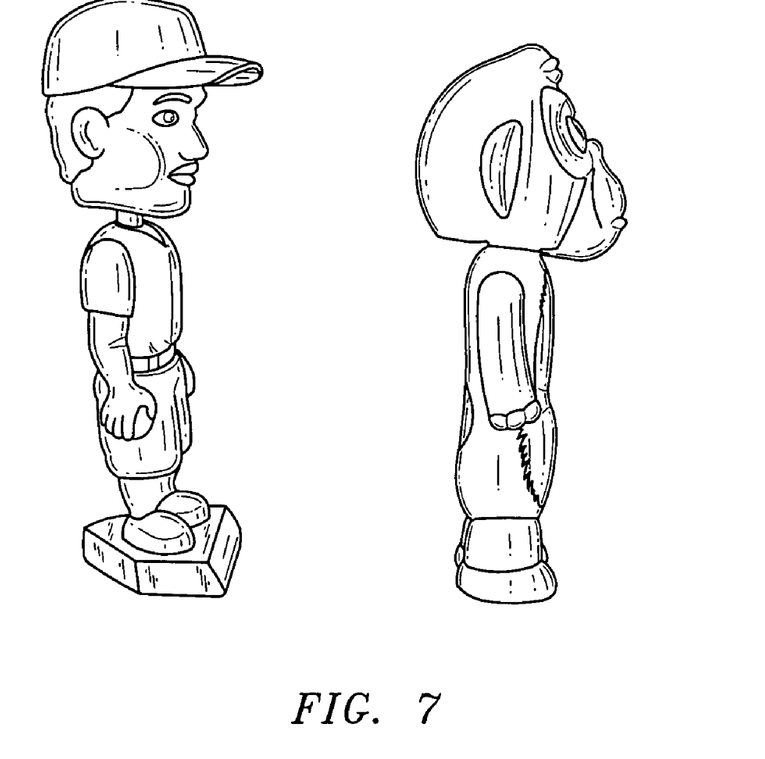
FIG. 7 is a right side isometric view showing the novelty candy devices of FIGS. 1 and 2 with the upper body portion attached to the lower body portion.
Figure 8:
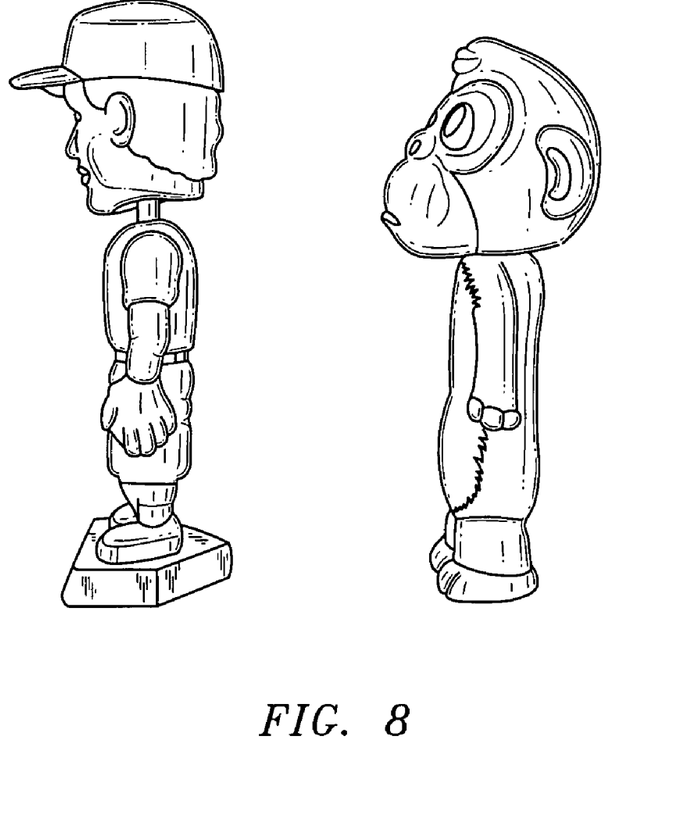
FIG. 8 is a left side isometric view showing the novelty candy devices of FIGS. 1 and 2 with the upper body portion attached to the lower body portion.

Referring to the drawings, a preferred embodiment of an improved novelty candy device is illustrated and is referred to generally by reference number 10. The device comprises a lower body portion 100 and an upper body portion 110. The lower body portion 100 of the device, as seen in FIG. 1, includes a handle 120 configured in the shape of the lower part of the figure represented by the device 10. The device also includes a flat base 130 at the bottom of the lower body portion 100. The flat base 130 enables the device to stand by itself on a flat surface. Integral with the lower body portion 100 is a candy or confection 140. It should be appreciated that the handle 120 serves to allow the user to hold and eat the candy 140 without touching the candy 140 itself in much the same way that the stick functions on a lollipop. Various means for attaching the candy 140 to the lower body portion 100 are contemplated, including a small projection on said lower body portion 100 around which the candy 140 is formed or attached, or even an edible adhesive.

Referring once again to FIG. 1, the upper body portion 110 of the novelty candy device is illustrated, which is mounted over the lower body portion 100. Included on the upper body portion 110 is a wobbly or bobble head 150. Various shapes, designs, and dimensions may be used so that the head 150 on the upper body portion 110 wobbles in a certain orientation, or randomly when slightly touched.

The upper body portion 110 may be placed on the lower body portion 100 during shipping and storage, or alternatively during or after consumption of the candy 140. It should be appreciated that the upper body portion 110 must include a cavity 160 that corresponds in size and shape to that of the candy 140. Furthermore, the shape of the upper body portion 110 should correspond and complement the shape of the lower body portion 100 such that the upper body portion 110 sits securely on the lower body portion 110 regardless of whether the candy 140 has been eaten.

The upper body portion 110 can be suitably modeled to represent a famous personality such as an athlete, movie actor, politician, or the like. The lower body portion 100 is modeled accordingly to represent the body portion of the character. Any relevant name, writing, or design can be imprinted on the flat base 130. For example, logos, copy, a personality or team name, etc., can be imprinted on the flat base 130. Caps or other related accessories or insignia can also be included on the head when appropriate for the character. The cap can be imprinted with a team logo or some related design. Accordingly, the novelty candy device can be used as a collectible item after consumption of the candy.

Having thus described the invention with particular reference to the preferred forms thereof, it will be obvious that various changes and modifications can be made therein without departing from the spirit and scope of the present invention as defined by the appended claims.

The inventor claims:

1. An improved novelty candy device comprising:
   an upper body portion having an internal cavity with an opening leading to said cavity,
   a wobbly head attached to said upper body;
   a lower body portion having a candy mass attached at a first end, and a base formed at a second end of said lower body portion;
   said candy mass configured to be slidably received into said cavity through said opening when said lower body is mated with said upper body;
   wherein said upper body portion is configured to alternatively cover and expose said candy portion, and further wherein said upper body portion is recognizably modeled after a real person or identifiable character.

2. The improved novelty candy device of claim 1, wherein said lower body portion further includes a flat base.

3. The improved novelty candy device of claim 2 wherein said base further comprises a visible well known name, trademark or logo.

4. The improved novelty candy device of claim 2 wherein said base further comprises a handle.

5. The improved novelty candy device of claim 1, including a projection extending from said lower body portion for attaching said candy mass.

6. The improved novelty candy device of claim 1, wherein said cavity corresponds in size and shape to the size and shape of said candy mass.

7. The improved novelty candy device of claim 1 further comprising a neck having a proximal end attached to said upper body portion, and a distal end of said neck for flexibly attaching said wobbly head.

8. The improved novelty candy device of claim 7 further comprising a spring having a proximal end attached to said distal neck end, and a distal spring end for attaching said wobbly head.

9. The improved novelty candy device of claim 8 wherein any relative movement between said wobbly head and said upper body portion imparts a random pattern of relative movement between said wobbly head and said upper body portion.

10. The improved novelty candy device of claim 8 wherein any relative movement between said wobbly head and said upper body portion imparts a predetermined pattern of relative movement between said wobbly head and said upper body portion.

11. The improved novelty candy device of claim 1 wherein said recognizable real person or identifiable character becomes a collectors item after said candy mass has been consumed.

12. The improved novelty candy device of claim 1 wherein said wobbly head further comprises head accessories.

13. The improved novelty candy device of claim 12 wherein said head accessories include sunglasses, hats, helmets, baseball hats, or jewelry.

14. The improved novelty candy device of claim 1 wherein said candy mass is attached to said lower body portion by an edible adhesive.

15. The improved novelty candy device of claim 1 wherein said opening is circumscribed by an upper mating surface and said lower body upper end is circumscribed by a lower mating surface.

16. The improved novelty candy device of claim 15 wherein said upper body and said lower body are securely coupled when said upper mating surface engages said lower mating surface.

17. The improved novelty candy device of claim 1 wherein said recognizable real person or identifiable character is one of a movie personality, sports figure, politician, scientist, athlete, television, radio or internet personality.

18. The improved novelty candy device of claim 1 wherein said recognizable real person or identifiable character is an infamous personality.

19. An improved novelty candy device comprising:
   an upper body portion having an internal cavity with an opening leading to said cavity, a lower body portion having a candy mass attached at a first end, and a base formed at a second end of said lower body portion;
said candy mass configured to be slidably received into said cavity through said opening when said lower body is mated with said upper body;
wherein said upper body portion is configured to alternatively cover and expose said candy portion, and further
wherein said upper body portion and said lower body portion are modeled after a real celebrity.

20. An improved novelty candy device comprising:
an upper body portion having an internal cavity with an opening leading to said cavity,
a lower body portion having a candy mass attached at a first end, and a base formed at a second end of said lower body portion;
said candy mass configured to be slidably received into said cavity through said opening when said lower body is mated with said upper body;
wherein said upper body portion is configured to alternatively cover and expose said candy portion, and further
wherein said upper body portion and said lower body portion are modeled after an identifiable person or character.

* * * * *